United States Patent [19]

Wegscheider

[11] 4,375,227

[45] Mar. 1, 1983

[54] HYDRAULIC DEVICE ESPECIALLY A HYDROPNEUMATIC ACCUMULATOR

[76] Inventor: Gustav Wegscheider, Nya Stadens Torg 13, Lidköping, Sweden, 531 13

[21] Appl. No.: 229,280

[22] Filed: Jan. 28, 1981

[30] Foreign Application Priority Data

Feb. 4, 1980 [SE] Sweden ............................... 8000853

[51] Int. Cl.$^3$ ............................................ F16L 55/04

[52] U.S. Cl. ........................................ 138/31; 138/26

[58] Field of Search .............................. 138/26, 30, 31

[56] References Cited

U.S. PATENT DOCUMENTS

| | | | |
|---|---|---|---|
| 2,742,978 | 4/1956 | Peterson et al. | 138/31 X |
| 3,043,340 | 7/1962 | Rehbock | 138/31 |
| 3,893,486 | 7/1975 | Meyer | 138/31 |
| 3,907,001 | 9/1975 | Vanderlaan et al. | 138/31 |
| 4,000,758 | 1/1977 | Meisenheimer | 138/31 |

*Primary Examiner*—James E. Bryant, III
*Attorney, Agent, or Firm*—Holman & Stern

[57] ABSTRACT

A hydraulic device, such as a hydropneumatic piston accumulator, having a freely displaceable piston which divides the cylinder into a liquid chambers and a gas chamber on opposite sides of the piston. In order to reduce the friction of the piston seals and the heat produced thereby and at the same time guarantee an effective sealing the piston during its initial or terminal movement close to its end position cooperates with a second sealing member at the end wall of the liquid chamber through a first sealing member, and between these sealing members a friction seal is arranged for preventing back flow of liquid from the liquid chamber to the inlet at the end wall but in flow of liquid in the opposite direction in additional the first sealing member is axially displaceable in relation to the piston to a limited extent.

8 Claims, 4 Drawing Figures

HYDRAULIC DEVICE ESPECIALLY A HYDROPNEUMATIC ACCUMULATOR

TECHNICAL FIELD

The present invention relates to a hydraulic device especially a hydropneumatic accumulator with a piston which is freely displaceable within a cylinder, said piston dividing the cylinder into a liquid and a gas chamber and which during its initial or terminal movement close to at least one of its end positions being arranged to cooperate with a second sealing member at the end wall of the liquid chamber by means of a first sealing member.

BACKGROUND OF THE INVENTION

In piston accumulators of the above mentioned kind sealing rings are used which are pressed against the sliding surface by the pressure medium whereby very good sealing is achieved, but the friction and heat release are high. The heat release can be so high that special cooling devices for the pressure medium are needed. If on the other hand low-friction sealings are used the piston will slide easily without any considerable heat release, but the sealing effect can be insufficient especially when the piston is displaced to its initial position, i.e. when the accumulator is discharged and the piston is at the end wall of the liquid chamber.

SUMMARY OF THE INVENTION

The object of the present invention is to provide a hydropneumatic accumulator which despite its very high sealing effect permits the piston to slide easily within the cylinder without any disturbing heat release and whereby a more uniform flow of the pressure medium is achieved.

This object of the invention is accomplished by first and second sealing members between which is arranged a sealing acting as a nonreturn valve preventing any flow of liquid from the piston to an inlet at said end wall, but permitting flow of liquid in the opposite direction, and the axial displacement of the first sealing member in relation to the piston is limited.

BRIEF DESCRIPTION OF THE DRAWINGS

The invention will now be described in greater detail with reference to the accompanying drawings wherein.

DESCRIPTION OF THE PREFERRED EMBODIMENTS

Figure 1:
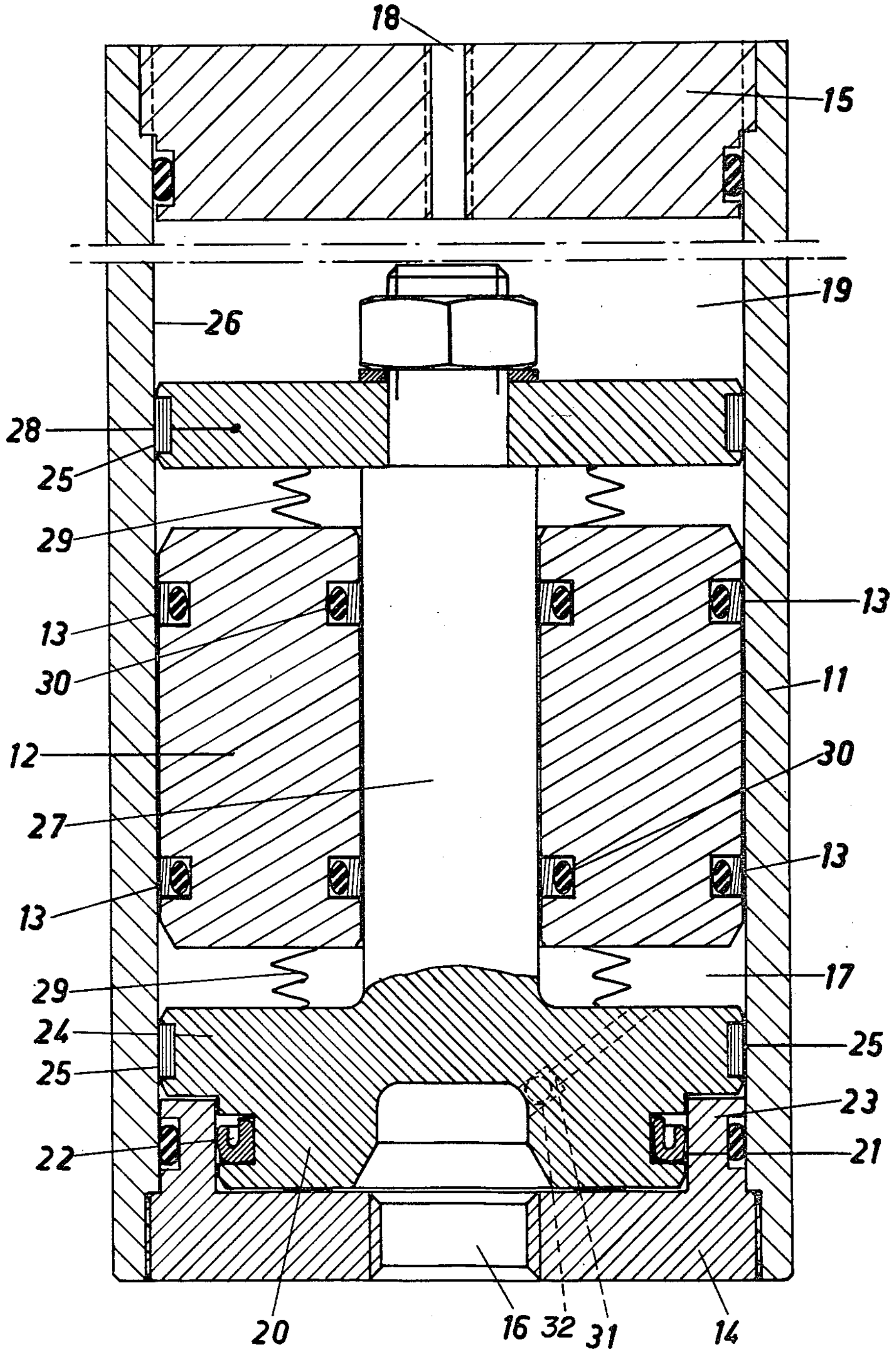
FIG. 1 is a longitudinal sectional view through a hydropneumatic accumulator according to the invention.

The accumulator according to the invention comprises a cylinder 11, a piston 12 with low-friction seals 13 and end walls 14 and 15 at the cylinder ends. In the end wall 14 there is arranged an inlet 16 to a liquid chamber 17 in one end of the cylinder extending to one end surface of the piston, while an inlet 18 in the end wall 15 communicates with a gas chamber 19 in the opposite end of the cylinder.

A first sealing member 20 is displaceably arranged with respect to piston 12 at the liquid chamber end of the cylinder, said sealing member according to the embodiment of FIG. 1 comprising an auxiliary piston with a friction seal 21 in the form of a lip sealing ring having a U-shaped cross-section, the opening 22 between the lips being remote from the inlet 16. The first sealing member 20 cooperates with a second sealing member 23 arranged at the inner part of the end wall 14 and being designed as a short axial cylinder.

In order to guide the piston 12 within the cylinder 11 the first sealing member 20 can be designed as a differential piston, the one smaller piston of which comprises said first sealing member, while its larger piston 24 has low-friction guides 25 in close contact with the inner wall 26 of the cylinder 11. The piston 12 is axially displaceable along a shaft 27 connected at one end to the first sealing member 20. A stop plate, which in this embodiment is designed as a guiding piston 28, is arranged at the other end of the shaft 27 remote from the first sealing member 20, said guiding piston 28 being provided with low-friction guides 25 in the same manner as the guiding piston 24. Between these guiding pistons 24 and 28 and the piston 12 there are arranged spring members 29, the object of which is to keep the piston 12 in a neutral position in relation to the guiding pistons. Low-friction seals 30 or the like are arranged on the inside of the hollow piston 12 to seal against shaft 27.

In FIG. 1 the accumulator is shown in a discharged or alternatively preloaded state and when a pressure fluid is supplied through the inlet 16 the lips of the friction seal 21 will let the pressure medium pass, so that it can act upon one of the end surfaces of the piston 12. As soon as the friction seal 21 looses contact with the second sealing member 23 only low-friction sealing occurs during the continued movement of the piston.

The heat release of the low friction seal 13 is very small and they permit the piston to slide relatively easily. When the piston approaches the initial position the friction seal 21 will during the last phase of this movement come into active position, at which time the outer lip of the seal is pressed against the inner surface of the second sealing member 23 and the inner lip is pressed against the inner surface of the lip groove in member 20 by the increasing liquid pressure in the space 22 between and above the lips.

During the initial displacement movement of the first sealing member 20 the pressure liquid will flow past the low-friction sealings 25 of the guiding piston 24 to the part of the liquid chamber 17 which is located between the guiding piston 24 and the piston 12. Since the piston 12 is axially displaceably mounted on the shaft 27 the displaced liquid is accommodated by the increase in the volume of chamber 17 the displacement of piston 12 towards the guiding piston 28. Thus the lip seal 21 will be operated by the liquid pressure and owing to its function as a nonreturn valve a very good sealing is guaranteed during the return of the piston 12 to the initial position. At the same time a counter pressure on the piston 12 is provided, which is advantageous if the accumulator is preloaded with e.g. nitrogen gas, since said counter pressure helps separate the gas from the liquid.

Figure 2:
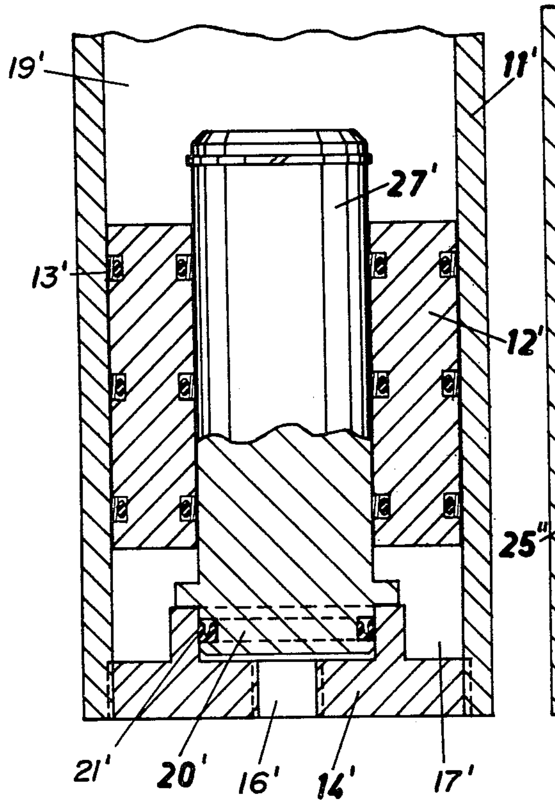
FIGS. 2–4 are longitudinal sectional views through three different modifications of the accumulator according to the invention.

The embodiment shown in FIG. 2 differs from the one according to FIG. 1 by the fact that one end 20' of the shaft 27' is designed as a first sealing member, i.e. as an auxiliary piston.

Figure 3:
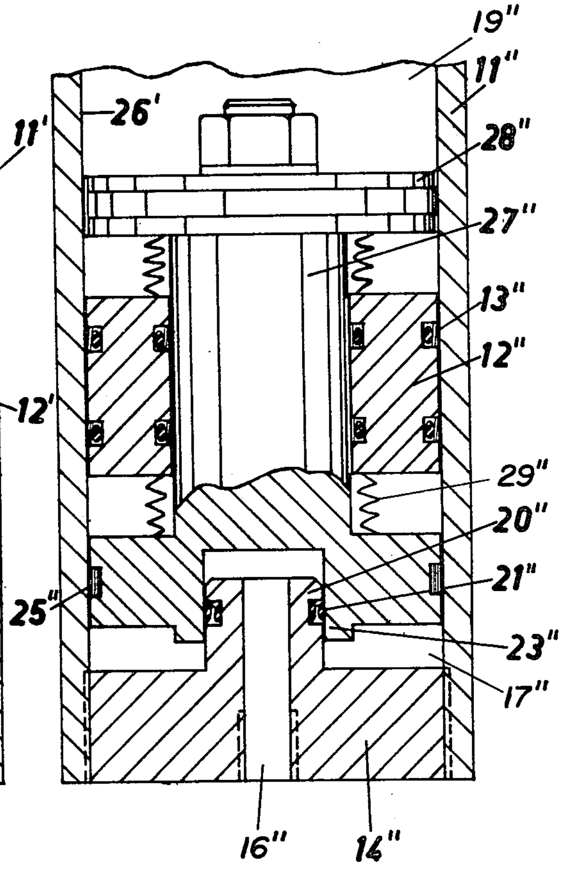

In the embodiment according to FIG. 3 the first sealing member is designed as an auxiliary cylinder 23'', while the end wall 14", i.e. the second sealing member, is designed with a fixed piston 20".

The mode of action of the embodiments shown in FIGS. 2 and 3 is principally the same as the one described with reference to FIG. 1.

It would of course also be possible to arrange a sealing member 20 and/or a differential piston 20, 24 on the side of the shaft 27 located in the gas chamber 19. In such a case the end wall 15 would be designed in the same way as end wall 14. In order to increase the flow from inlet 16 past the friction seal 21, a by-pass passage 31 can be arranged in the first sealing member and differential piston between inlet 16 and a nonreturn valve 32 being arranged in said passage permitting the liquid to flow towards the piston 12 but not in the opposite direction.

Figure 4:
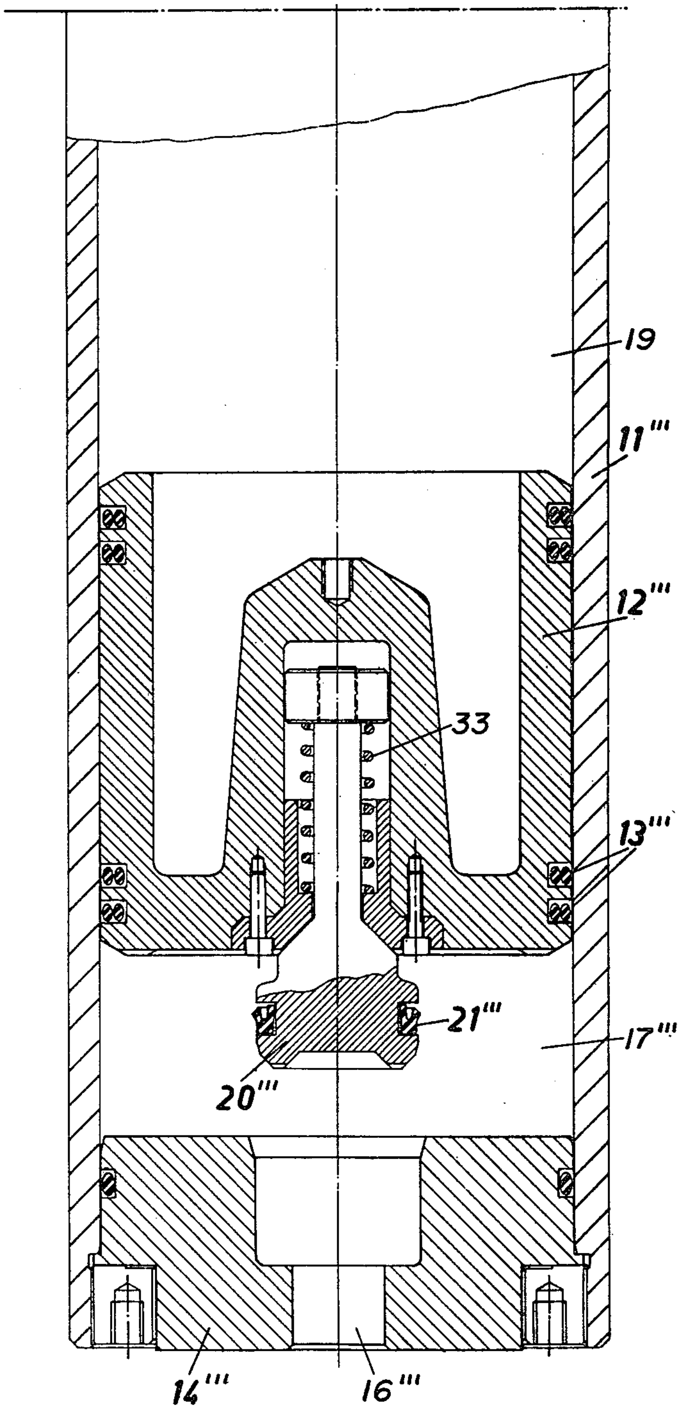

The embodiment shown in FIG. 4 is most similar to that of FIG. 2, but differs therefrom mainly in that the sealing member 20‴ is spring-loaded by spring 33 mounted within piston 12‴, and there is no passage through the piston 12‴, which means an elimination of any leakage of liquid in this way.

What I claim is:

1. A hydropneumatic accumulator comprising a cylinder, a piston freely axially displaceable within said cylinder and dividing said cylinder into a hydraulic fluid chamber and a gas chamber at opposite ends of said piston, an end wall closing the end of the cylinder adjacent said hydraulic fluid chamber, an inlet part through said end wall for hydraulic fluid, a first sealing member in said hydraulic fluid chamber adapted for axial displacement with respect to said piston, means to limit said axial displacement of said first sealing member, a second sealing member cooperatively associated with said first sealing member for providing relative axial displacement between said sealing members and a flow channel between said inlet part and said hydraulic fluid chamber, and seal means between said first and second sealing members to permit flow of hydraulic fluid through said channel from said inlet part to said hydraulic fluid chamber, and to prevent backflow of hydraulic fluid from said hydraulic fluid chamber to said inlet part when the pressure on the hydraulic fluid chamber side of said seal exceeds the inlet pressure.

2. An accumulator according to claim 1, wherein said sealing members comprise an auxiliary piston and an auxiliary cylinder, and said seal means comprises at least one firction seal in the form of a lip seal ring having a U-shaped cross-section, the opening between the lips being remote from the hydraulic fluid chamber.

3. An accumulator according to claim 2, wherein the opening between the adjacent ends of the lips of said friction seal are in communication with the hydraulic fluid chamber between one end of the piston and said first sealing member.

4. An accumulator according to claim 1, wherein said first sealing member comprises a differential piston having an integrated smaller and larger piston, said larger piston being in sliding contact with the inner wall of said cylinder and having low friction guides at the point of contact.

5. An accumulator according to claim 4, wherein said means to limit axial displacement of said first sealing member comprises a shaft connected at one end to the first sealing member, a bore in said piston slidably receiving said shaft, and stop means adapted to limit the displacement of said shaft in said bore.

6. A accumulator as claimed in claim 5 wherein said larger piston of said differential piston is a first guiding piston and is attached to said one end of said shaft, said bore extends completely through said piston, said shaft extends through said bore, a second guiding piston is attached to the other end of said shaft and is in sliding engagement with the inner wall of said cylinder, and spring means are disposed between said first and second guiding piston and the respective end of said piston resiliently urging said guiding piston away from said piston.

7. An accumulator as claimed in claim 5 wherein said stop means comprises a member having a larger diameter than said shaft mounted on the other end of said shaft, and spring means interposed between said larger diameter members and said piston to urge said first sealing member towards said piston, and cooperating engageable shoulders on said first sealing member and said piston.

8. An accumulator as claimed in claim 1 and further comprising a second end wall closing the other end of said cylinder adjacent said gas chamber, a gas inlet part through said second end wall, a first gas chamber sealing member in said gas chamber adapted for axial displacement with respect to said piston, a second gas chamber sealing member cooperatively associated with said first gas chamber sealing member for providing relative axial displacement therebetween and a flow channel between said gas inlet part and said gas chamber, and a second seal means between said first and second gas chamber sealing member to permit flow of gas through said channel from said gas inlet part to gas chamber, and to prevent backflow of gas from said gas chamber to said gas inlet part where the pressure on the gas chamber side of said second seal means exceeds the inlet pressure.

* * * * *

UNITED STATES PATENT AND TRADEMARK OFFICE

CERTIFICATE OF CORRECTION

PATENT NO. : 4,375,227

DATED : March 1, 1983

INVENTOR(S) : Gustav Wegscheider

It is certified that error appears in the above-identified patent and that said Letters Patent is hereby corrected as shown below:

The title page showing the illustrative figure should be deleted to appear as per attached title page.

Signed and Sealed this

*Twenty-first* Day of *June 1983*

[SEAL]

*Attest:*

DONALD J. QUIGG

*Attesting Officer* *Acting Commissioner of Patents and Trademarks*

United States Patent [19] — [11] 4,375,227

Wegscheider — [45] Mar. 1, 1983

[54] HYDRAULIC DEVICE ESPECIALLY A HYDROPNEUMATIC ACCUMULATOR

[76] Inventor: Gustav Wegscheider, Nya Stadens Torg 13, Lidköping, Sweden, 531 13

[21] Appl. No.: 229,280

[22] Filed: Jan. 28, 1981

[30] Foreign Application Priority Data

Feb. 4, 1980 [SE] Sweden ............ 8000853

[51] Int. Cl.³ ............ F16L 55/04

[52] U.S. Cl. ............ 138/31; 138/26

[58] Field of Search ............ 138/26, 30, 31

[56] References Cited

U.S. PATENT DOCUMENTS

| | | | |
|---|---|---|---|
| 2,742,978 | 4/1956 | Peterson et al. | 138/31 X |
| 3,043,340 | 7/1962 | Rehbock | 138/31 |
| 3,893,486 | 7/1975 | Meyer | 138/31 |
| 3,907,001 | 9/1975 | Vanderlaan et al. | 138/31 |
| 4,000,758 | 1/1977 | Meisenheimer | 138/31 |

*Primary Examiner*—James E. Bryant, III
*Attorney, Agent, or Firm*—Holman & Stern

[57] ABSTRACT

A hydraulic device, such as a hydropneumatic piston accumulator, having a freely displaceable piston which divides the cylinder into a liquid chambers and a gas chamber on opposite sides of the piston. In order to reduce the friction of the piston seals and the heat produced thereby and at the same time guarantee an effective sealing the piston during its initial or terminal movement close to its end position cooperates with a second sealing member at the end wall of the liquid chamber through a first sealing member, and between these sealing members a friction seal is arranged for preventing back flow of liquid from the liquid chamber to the inlet at the end wall but in flow of liquid in the opposite direction in additional the first sealing member is axially displaceable in relation to the piston to a limited extent.

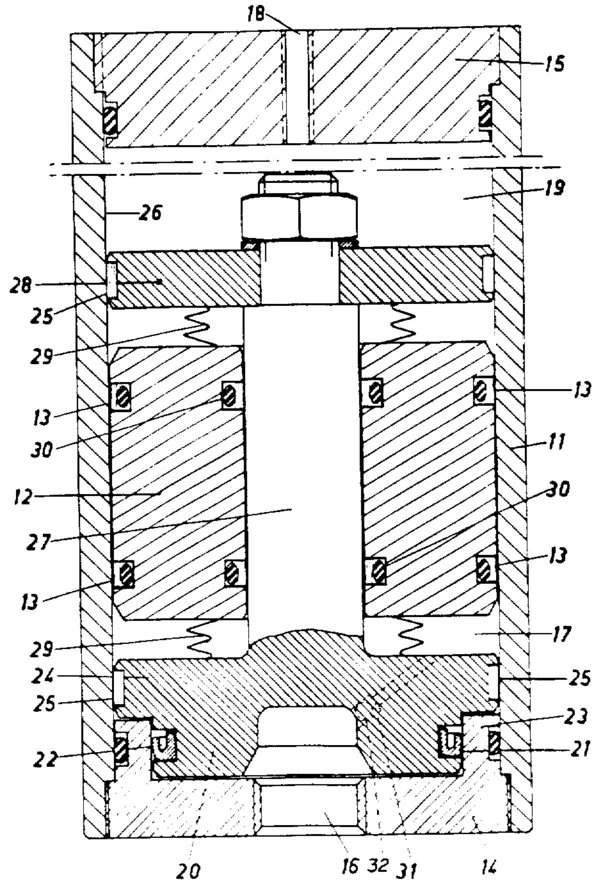

8 Claims, 4 Drawing Figures